(12) United States Patent
Davenport et al.

(10) Patent No.: US 6,453,099 B1
(45) Date of Patent: Sep. 17, 2002

(54) MULTI-STRANDED FIBEROPTIC LIGHT DELIVERY SYSTEM WITH SMOOTH COLOR TRANSITIONING

(75) Inventors: John M. Davenport, Lyndhurst; Roger F. Buelow, II, Cleveland, both of OH (US)

(73) Assignee: Fiberstars Incorporated, Solon, OH (US)

(*) Notice: Subject to any disclaimer, the term of this patent is extended or adjusted under 35 U.S.C. 154(b) by 62 days.

(21) Appl. No.: 09/776,208

(22) Filed: Feb. 2, 2001

(51) Int. Cl.[7] ............................... G02B 6/04
(52) U.S. Cl. ..................... 385/115; 385/116; 385/73
(58) Field of Search ........................ 385/115, 116, 385/73

(56) References Cited

U.S. PATENT DOCUMENTS

| | | |
|---|---|---|
| 5,259,056 A | 11/1993 | Davenport et al. |
| 5,367,590 A | 11/1994 | Davenport et al. |
| 6,192,176 B1 | 2/2001 | Cassarly et al. |

OTHER PUBLICATIONS

Specification and drawings for co–pending, previously filed US Patent Application S.N. 09/539,652 filed Mar. 30, 2000 for Waterproof Light Delivery System, by John M. Davenport et al.

*Primary Examiner*—Ellen E. Kim
(74) *Attorney, Agent, or Firm*—Charles E. Bruzga

(57) ABSTRACT

An exemplary embodiment of the invention provides a multi-stranded fiberoptic light delivery system for delivering light to a plurality of fixtures. Each of the fixtures receives light from one or more active strands of a fiberoptic cable. A light source provides a light beam for transmission through the cable. A light-coloring device receives the light beam and sequentially imparts to the light beam different colors. A rod is interposed in the light beam between the color wheel and the fixtures. The rod has an inlet for receiving the light beam and an outlet for transmitting light to the cable. The rod has a length at least high enough to cause it to pass to all active strands a portion of the light of a color just starting to be received at its inlet.

13 Claims, 6 Drawing Sheets

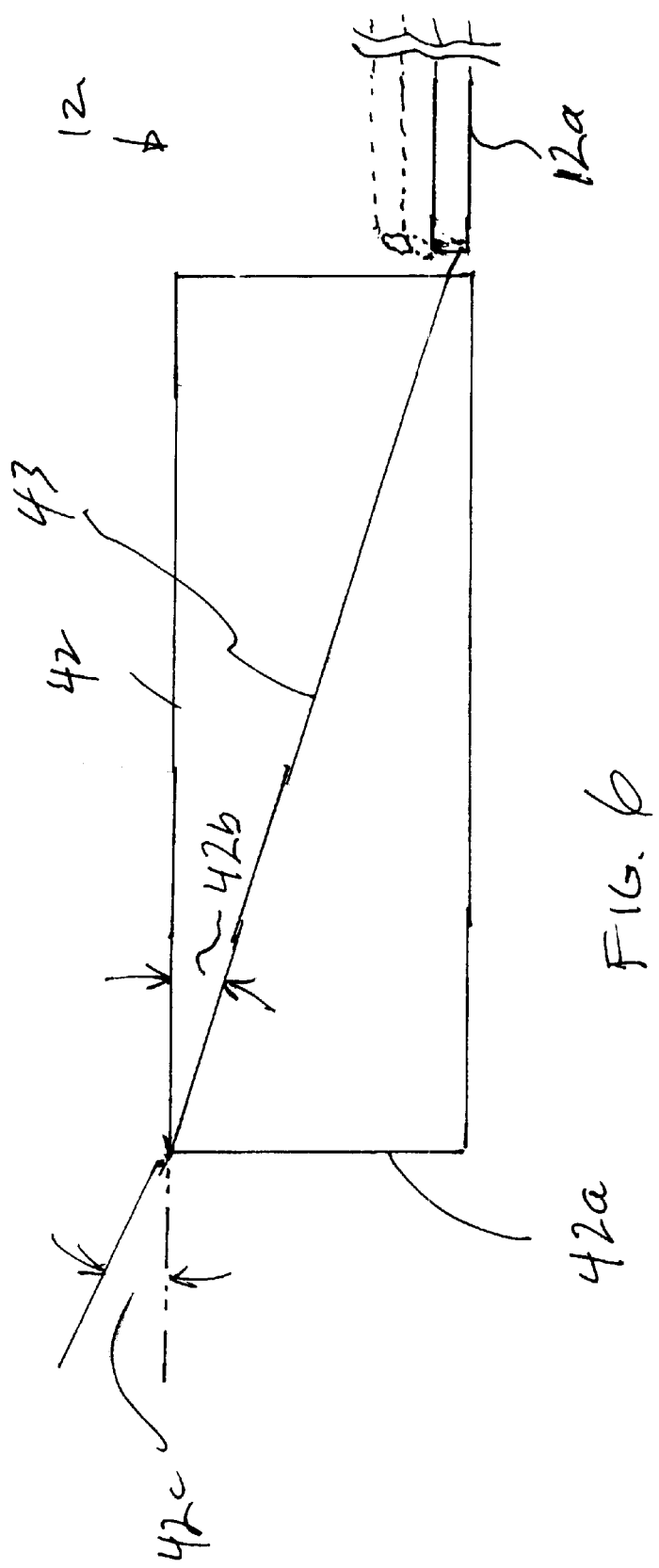

MULTI-STRANDED FIBEROPTIC LIGHT DELIVERY SYSTEM WITH SMOOTH COLOR TRANSITIONING

FIELD OF THE INVENTION

The present invention relates to a multi-stranded light delivery system for providing light to a plurality of light fixtures.

BACKGROUND OF THE INVENTION

Current light delivery systems for a pool or spa may use multi-stranded fiberoptic cable to provide light to several fixtures in the pool or spa. It is aesthetically pleasing to periodically change the color of light provided to the various fixtures. However, transitioning from one color to another frequently presents a problem. When using a color wheel, for instance, due to the multi-stranded structure of the cable, some fibers change color abruptly from red to blue, for instance, while others remain blue for some time. This effect can be displeasing.

One partial solution is to use a stepper motor to abruptly change the color for all strands at essentially the same time. But, such abruptness can also be displeasing. It would thus be desirable to smoothly change the color of light for all strands from one color to another.

SUMMARY OF THE INVENTION

An exemplary embodiment of the invention provides a multi-stranded fiberoptic light delivery system for delivering light to a plurality of fixtures. Each of the fixtures receives light from one or more active strands of a fiberoptic cable. A light source provides a light beam for transmission through the cable. A light-coloring device receives the light beam and sequentially imparts to the light beam different colors. A rod is interposed in the light beam between the color wheel and the fixtures. The rod has an inlet for receiving the light beam and an outlet for transmitting light to the cable. The rod has a length at least high enough to cause it to pass to all strands a portion of the light of a color just starting to be received at its inlet.

The foregoing system can smoothly change the color of light for all strands from one color to another.

DESCRIPTION OF THE DRAWINGS

FIG. 6 is a side plan view of a rod of FIG. 4 used for color mixing together with a portion of the cable of FIG. 4.

DETAILED DESCRIPTION OF THE INVENTION

Figure 1:
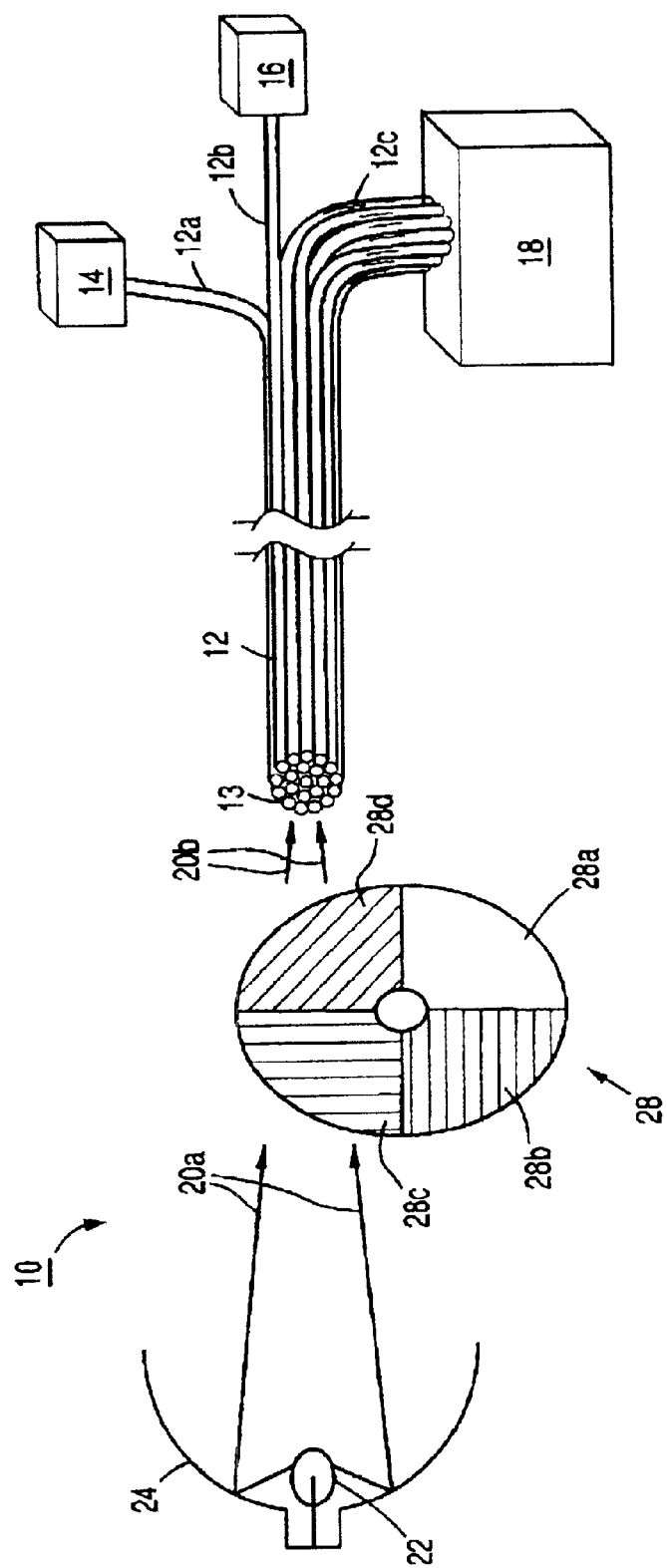
FIG. 1 is simplified, perspective view, partially in three-dimensional block form, of a prior art multi-staged fiberoptic light delivery system.

FIG. 1 shows a simplified view of a prior art fiberoptic light delivery system 10 including a multi-stranded fiberoptic cable 12 for delivering light to a plurality of light fixtures 14, 16 and 18. Cable 12 comprises a bundle of individual fiberoptic strands. Light fixtures 14 and 16 are supplied with light from respective single strands 12a and 12b. Fixtures 14 and 16 may provide small spots of light. Fixture 18 receives light from a plurality of strands 12c, and may provide a large spot of light. Strands transmitting light to a light fixture are referred to herein as "active" strands.

A light beam, e.g., 20a, 20b, for transmission through cable 12 may be provided from a lamp 22, such as a halogen or metal halide lamp. Light rays (not numbered) from the lamp are directed by a reflector 24 or other type of optical coupling device to cable 12 via a light-coloring device such as a color wheel 28. Wheel 28 has successive circumferential portions 28a–28d, with each pair of adjacent portions having respectively different color-filtering properties. Exemplary color differences are shown by cross hatching patterns or the absence of a pattern, with pattern 28a indicating a clear area (having a filtering level of zero), portion 28b indicating a blue area, portion 28c indicating a red area, and portion 28d indicating a green area. In known manner, wheel 28 is moveable so as to be able to move each successive portion through the light beam (e.g., 20a, 20b).

Figure 2:
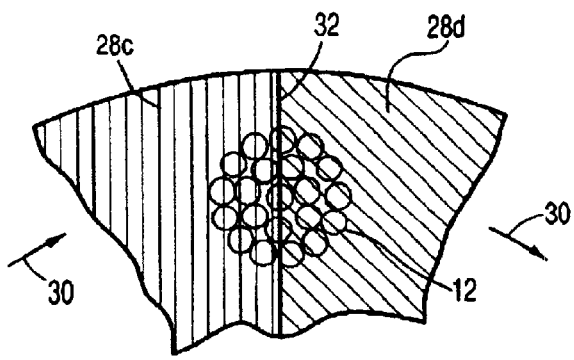
FIG. 2 is plan view of a portion of the color wheel and the fiberoptic cable of the system of FIG. 1.
Figure 3:
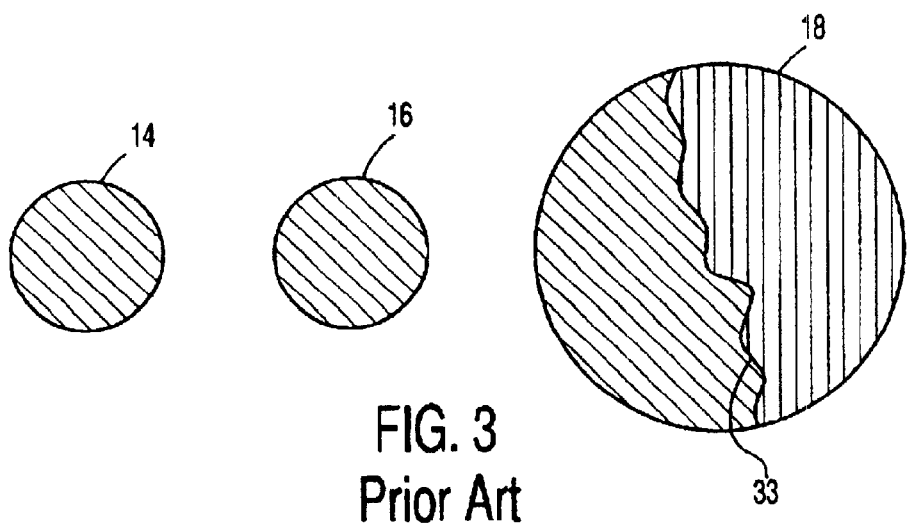
FIG. 3 is a plan view of the light fixtures of FIG. 1 arranged side by side for convenience of illustration.

FIGS. 2 and 3 illustrate a problem with the changing of colors in prior art system 10. With the color wheel advancing in the direction of arrows 30, boundary 32 between adjacent wheel portions 28c and 28d moves from left to right across multi-stranded cable 12. As FIG. 3 shows, light passing through strands to the left of boundary 32 (FIG. 2), e.g., to fixture 14, is red, while light passing through strands on the right of the boundary, e.g., to fixture 16, is green. This causes three problems. First, it causes rather abrupt color changes in the light (not shown) provided by fixtures 14, 16 and 18, which is often displeasing to observe. Second, it can cause the light from fixture 14 to have one color and the light from, e.g., fixture 16 to have another color, which again may be displeasing to observe. Third, it can cause multiple colors of light to be provided by, e.g., fixture 18, which is supplied from multiple strands of cable. For instance, it can provide red light to be provided left of a boundary 33 (FIG. 3) and green light to be provided on the right. This, again, may be displeasing.

Figure 4:
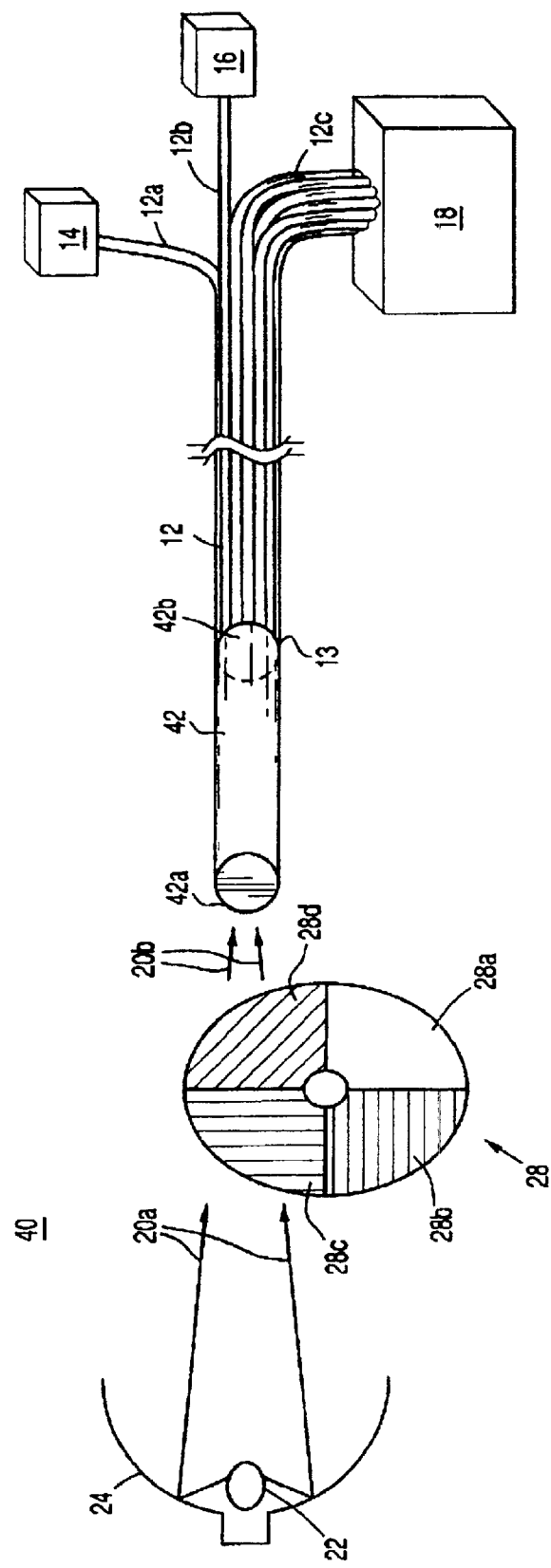
FIG. 4 is a simplified, perspective view, partially in three-dimensional block form, of an inventive multi-stranded fiberoptic light delivery system.

FIG. 4 shows a simplified view of an inventive system 40 that can eliminate any or all of the foregoing problems. Many of the parts of system 40 can be like the like-numbered parts in system 10 (FIG. 1). System 40 includes a rod 42, which may be solid, interposed in light beam 20a, 20b between a light-coloring device such as light wheel 28 and fixtures 14, 16 and 18. The surface area of an outlet 42b of the rod and the adjacent surface of cable 12 are preferably coextensive. In this connection, where cable 12 comprises a bundle of 300 fiberoptic strands of 0.75 mm diameter each, rod 42 may have a diameter of about 15 mm.

Figure 5:
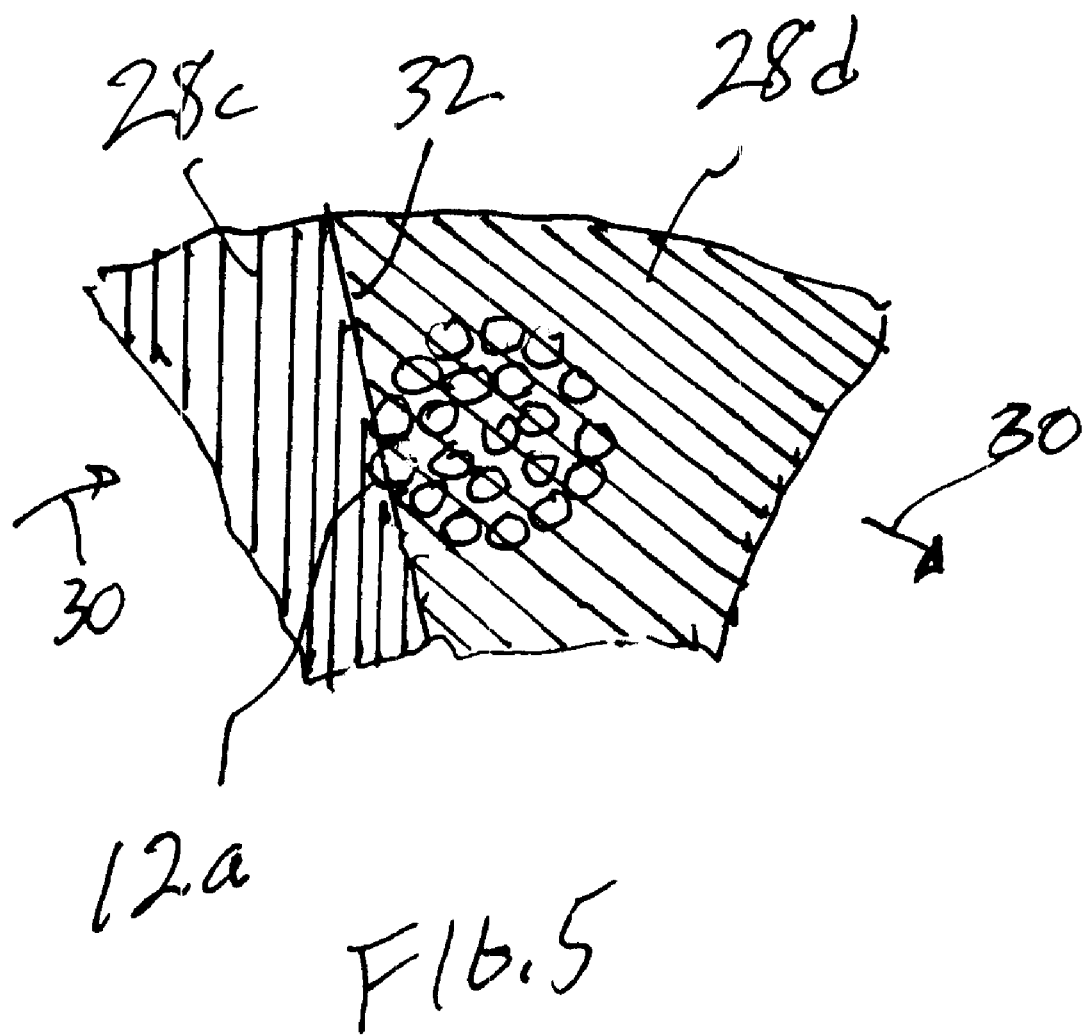
FIG. 5 is a view similar to FIG. 2 but showing the color wheel in a different position.

Rod 42 is selected to have a length at least high enough to cause it to pass to all active strands of the cable a portion of the light of a color just starting to be received at its inlet. For instance, as shown in FIG. 5, boundary 32 just starts to cross over a portion of strand 12a, so that strand 12a just starts to receive red light from color wheel portion 28c in addition to green from portion 28d. In FIG. 6, this is indicated by a ray 43 of red light provided to rod inlet 42a. The rest of the inlet receives green light, for instance, from rays that are not shown. FIG. 6 shows ray 43 being received by the lower portion of strand 12*a*. For simplicity, not all strands of cable 12 are shown, and some are shown in phantom line. It will be obvious to those of ordinary skill in the art how to select the length of the rod to achieve the mentioned result.

By way of example, where the strands of a cable 12 have an acceptance half angle of 30 degrees, the length to diameter ratio for a round cross-sectioned rod 42 with an index of refraction of about 1.5 is preferably greater than about 2.8, and more preferably greater than about 4 to 5 times the diameter of the rod. Color mixing for a round cross sectioned rod generally improves with increasing length, but due to a periodic effect of focusing some lengths provide better color mixing than others. For a round cross sectioned rod, the minimum length can be derived from the equation:

$$N_{rod}*\text{sine of angle } 42b = N_{outside}*\text{sine of angle } 42c,$$

where:

$N_{rod}$ is the index of refraction of the rod;

Angle 42*b* is the angle that ray 43 makes to the main axis (not shown) of light propagation within the rod;

$N_{outside}$ is the index of refraction of outside the rod; and

Angle 42*c* is the angle that ray 43 makes to the main axis (not shown) of light propagation outside the rod.

For a square cross sectioned rod, the length to diagonal cross section ratio is also preferably greater than about 2.8, and more preferably greater than about 4 to 5 times the diameter of the rod. These same ranges apply to the length to maximal cross sectional dimension ratio for rods of other shapes, such as oval.

Although a rod selected to achieve good color mixing might not assure that the intensity of light passing through it substantially increases in uniformity, in many fiberoptic systems such as pool or spa illuminators, such an increase is unnecessary. Where compactness is required, it may be adequate to make the rod long enough to cause substantially uniform color mixing but not so long as to attain a substantial increase in uniformity of light intensity among the various strands of cable. If a greater increase in uniformity of intensity of light is desired, the rod can be made longer or polygonal (e.g., square) in cross section. An 8:1 ratio of length-to-maximum cross sectional dimension for a square cross-sectioned rod typically achieves a very substantial increase of uniformity of light intensity. By a "substantial" increase in uniformity of light intensity is meant herein at least about a 75 percent decrease in the peak-to-average intensity. By "substantially uniform" in color is meant herein so uniform that any non-uniformity is not perceived as an abrupt change in color to the naked eye.

Figure 7:
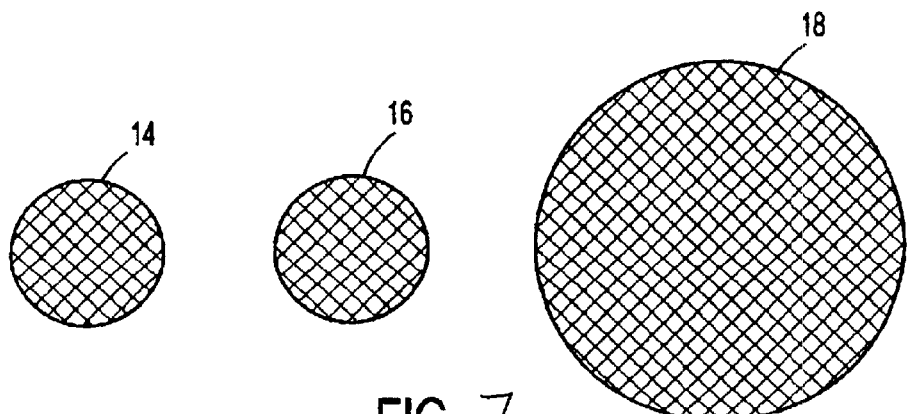
FIG. 7 is a plan view of the light fixtures of FIG. 4 arranged side by side for convenience of illustration.

With light exiting the rod at all portions of its outlet 42*b* with substantially the same color, at least three advantages are realized. First, light reaching fixtures 14, 16 and 18 all have the same color, e.g., orange as indicated by the cross hatching in FIG. 7. This provides a pleasing lighting effect. Second, the light changes from one color to another in a smooth manner. Thus, referring to FIG. 2, if color wheel portion 28*c* is red and color wheel portion 28*d* green, for instance, the color emitted from rod outlet 42*b*—and hence from all fixtures—will gradually change from red, to orange, to green. This can provide an especially pleasing and soothing effect. Third, the rapidity of changing color from one color wheel portion to an adjacent portion can be easily controlled simply by adjusting the speed of rotation of the color wheel. Different lighting moods—resulting from slow-changing color to fast-changing color—can then be easily realized.

Figure 8:
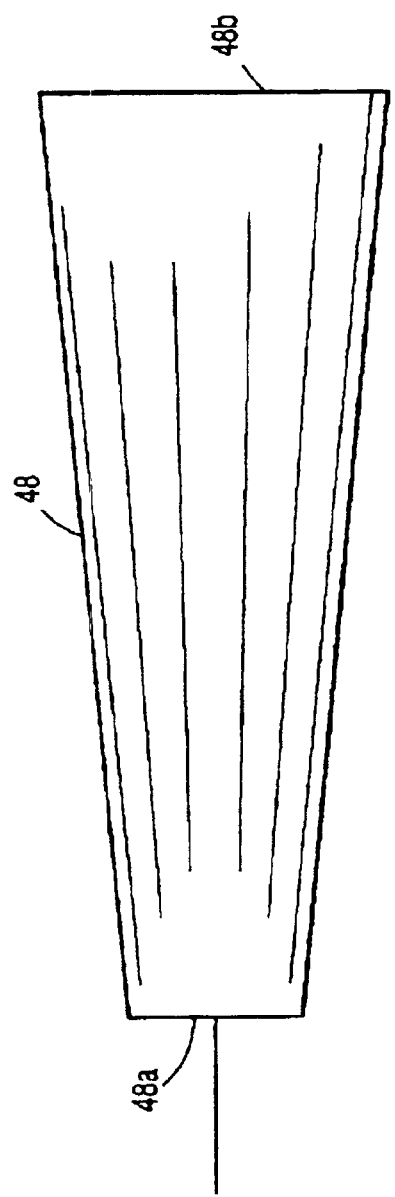
FIG. 8 is a perspective view of a hollow rod that may be used in the system of FIG. 4.

For ease of manufacture, rod 42 may be generally cylindrical and formed of acrylic or glass, for instance. Its acceptance half angle for light preferably, but not critically, is at least that of the strands of fiber that receive light from it. For changing angles of light, the rod may be tapered, for instance, as shown in FIG. 8. The tapering up from inlet 48*a* to outlet 48*b* of rod 48 can reduce angles of light from, e.g., 40 degrees to 30 degrees. Tapering may conform to a compound parabolic collector (CPC) shape. A CPC is a specific form of an angle-to-area converter, as described in detail in, for instance, W. T. Welford and R. Winston, High Collection Nonimaging Optics, New York: Academic Press, Inc. (1989), chapter 4 (pp. 53–76).

Rod 42 can be inserted at any point along the light beam between the light-coloring device and fixtures 14, 16 and 18 (FIG. 4). Preferably, it is inserted before any of the fixtures so they all benefit from uniform color, etc. However, for thermal reasons, it is desirable to insert the rod between the color wheel and a leading end 13 of cable 12. This is because the rod can be easily made thermally resistant to the heat of the light beam near the lamp, for example, made of quartz, glass or other thermally resistant material. In contrast, the strands of cable 12 typically have a reduced thermal resistance because they are usually formed of plastic. Placing a thermally resistant rod before the leading end 13 of the cable protects the cable, and can eliminate the need for a cooling fan typically required in prior art systems such as that of FIG. 1.

If a plastic rod 42, such as a length of solid-core fiberoptic cable, is positioned to receive light from color wheel 28, cooling from a fan may be needed.

Figure 9:
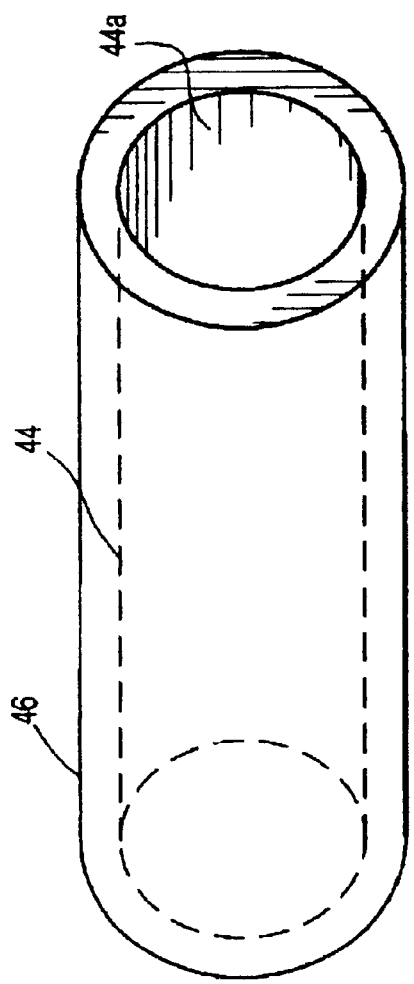
FIG. 9 is a side plan view of a rod that may be used in the system of FIG. 4.

An alternative to rod 42, preferably solid, is shown in FIG. 9 as a hollow rod 44 formed in a tubular piece 46 of material. The interior surface 44*a* of the rod is reflective.

While the invention has been described with respect to specific embodiments by way of illustration, many modifications and changes will occur to those of ordinary skill in the art. It is, therefore, to be understood that the appended claims are intended to cover all such modifications and changes as fall within the true scope and spirit of the invention.

What is claimed is:

1. A multi-stranded fiberoptic light delivery system, comprising:
   a) a multi-stranded fiberoptic cable for delivering light to a plurality of fixtures, each of which receives light from one or more active strands of the cable;
   b) a light source for providing a light beam to be transmitted through the fiberoptic cable;
   c) a light-coloring device for receiving the light beam and sequentially imparting to the light beam different colors; and
   d) a rod interposed in the light beam between the color wheel and the fixtures; the rod having an inlet for receiving the light beam and an outlet for transmitting light to the cable; and
   e) the rod having a length at least long enough to cause it to pass to all active strands a portion of the light of a color just starting to be received at its inlet.

2. The system of claim 1, wherein each different color is substantially uniform.

3. The system of claim 1, wherein the light-coloring device comprises a color wheel including:
   a) a plurality of successive circumferential portions, with adjacent portions having different color filtering properties;

b) the wheel being moveable so as to be able to move each successive portion through the light beam.

4. The system of claim 1, wherein:
a) the cable has a leading end; and
b) the rod is positioned between the light-coloring device and the leading end.

5. The system of claim 4, wherein the rod is selected to be thermally resistant from heat from light it receives without requiring a cooling fan.

6. The system of claim 1, wherein the rod is sufficiently long to cause substantially uniform color mixing but too short to cause a substantial increase in uniformity of light intensity among the various strands of the cable.

7. The system of claim 1, wherein the rod is selected to have a length achieving a substantial increase in uniformity of light intensity.

8. The system of claim 1, wherein the rod is solid.

9. A multi-stranded fiberoptic light delivery system, comprising:
a) a multi-stranded fiberoptic cable for delivering light to a plurality of fixtures, each of which receives light from one or more active strands of the cable;
b) a light source for providing a light beam to be transmitted through the fiberoptic cable;
c) a light-coloring device for receiving the light beam and sequentially imparting to the light beam different colors; and
d) a rod interposed in the light beam between the color wheel and the fixtures; the rod having an inlet for receiving the light beam and an outlet for transmitting light to the cable; and
e) the length of the rod being at least about 2.8 times the maximum cross-sectional dimension of the light-transmitting portion of the cable.

10. The system of claim 9, wherein the rod receives light from the light-coloring device at a half angle of no more than about 30 degrees.

11. The system of claim 9, wherein the length of the rod is at least about 4 times the maximum cross sectional dimension of the rod.

12. The system of claim 9, wherein the rod is sufficiently long to cause substantially uniform color mixing but too short to cause a substantial increase in uniformity of light intensity among the various strands of the cable.

13. The system of claim 9, wherein the rod is selected to have a length achieving a substantial increase in uniformity of light intensity.

\* \* \* \* \*